March 19, 1957 P. L. OSWEILER 2,786,127
WORK SUPPORT FOR WELDERS
Filed April 7, 1954 2 Sheets-Sheet 1
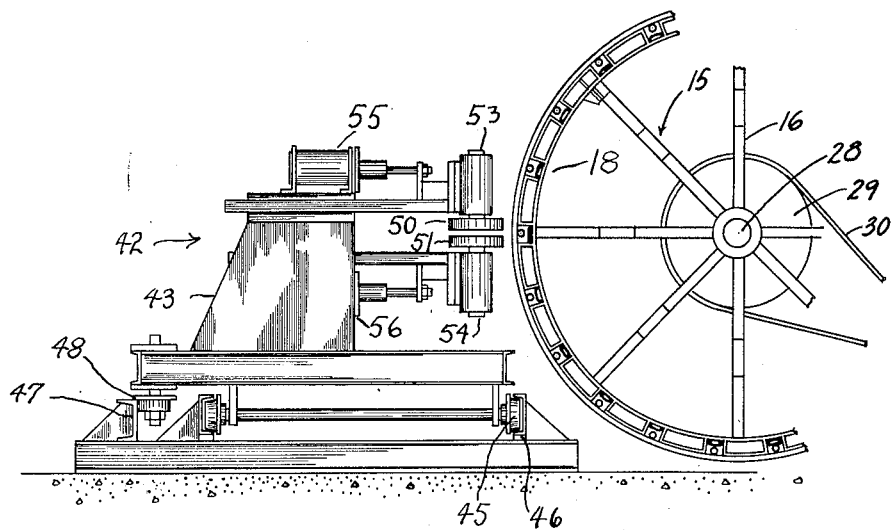
Fig. 1
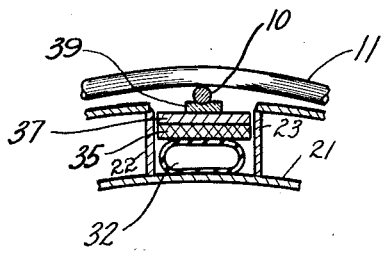
Fig. 2
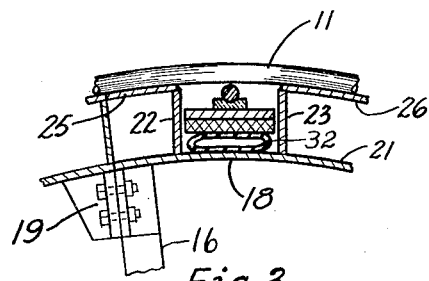
Fig. 3
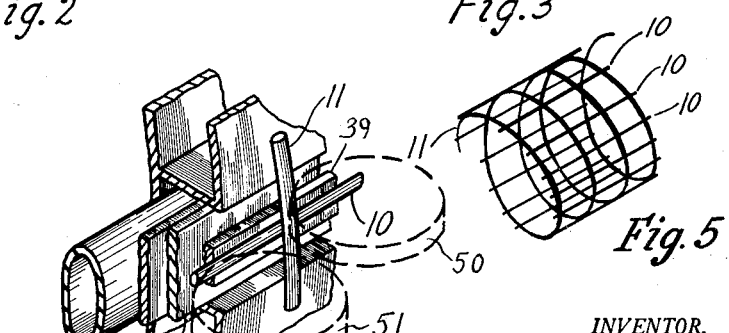
Fig. 4
Fig. 5
INVENTOR.
Paul L. Osweiler
BY Robert L. Kahn
Attorney March 19, 1957  P. L. OSWEILER  2,786,127
WORK SUPPORT FOR WELDERS
Filed April 7, 1954  2 Sheets-Sheet 2

INVENTOR.
Paul L. Osweiler
BY Robert L. Kahn
Attorney

United States Patent Office 2,786,127
Patented Mar. 19, 1957

2,786,127
WORK SUPPORT FOR WELDERS

Paul L. Osweiler, Dayton, Ohio, assignor to Price Brothers Company, Montgomery County, Ohio, a corporation of Michigan Application April 7, 1954, Serial No. 421,520

5 Claims. (Cl. 219—56)

This invention relates to a work support for welders and particularly for supporting cross wire or metal rod in connection with the fabrication of metal mesh. The invention is particularly adapted for use in connection with the manufacture of steel reinforcing mesh for use in reinforced concrete pipe.

As is well known, reinforced concrete pipe used for carrying water under pressure, for example, usually has longitudinal steel wire or rod joined to wire extending circularly. The circularly extending wire may form a helix lengthwise of the pipe or the wire may be disposed in separate lengths to form a sort of steel mesh, the mesh being shaped to form a generally cylindrical shape. In the latter case, the mesh may be made in indefinite length and cut off to size, the width of the mesh corresponding to the length of the concrete pipe.

It is of the utmost importance that the metal rods or wires at the joints be strongly welded together. Thus a strong steel mesh, where steel is used, is formed which may be used in concrete structures, notably pipes, but which may also have other applications such as, for example, in water tanks and other constructions.

In the fabrication of such mesh, it has been customary to dispose the two sets of wires on a collapsible mandrel and utilize resistance welding for joining the wires at desired spots. It has been found, however, that unless the wires are firmly retained in tight contact until welding has been accomplished and the joint has cooled, there will be a likelihood of either a faulty weld or no weld at all.

The problem, both in its more general aspect and its specific aspect, will be better understood after the invention has been explained. Referring, therefore, to the drawings, there is illustrated one embodiment of the invention, it being understood, however, that variations may be made, all within the scope of the invention as defined by the appended claims.

Figure 1 shows an end view of a welding machine and part of a mandrel carrying the metal wires to be welded, the mandrel embodying the present invention.

Figure 2 is a sectional detail of a part of the mandrel, the view at the section being along the same general line as the view of the mandrel in Figure 1.

Figure 3 is a sectional detail similar to Figure 2 but showing the wires to be welded out of contact with each other.

Figure 4 is a perspective view of a portion of the mandrel illustrating the invention.

Figure 5 is a perspective detail of part of a cage after welding.

Figure 6:
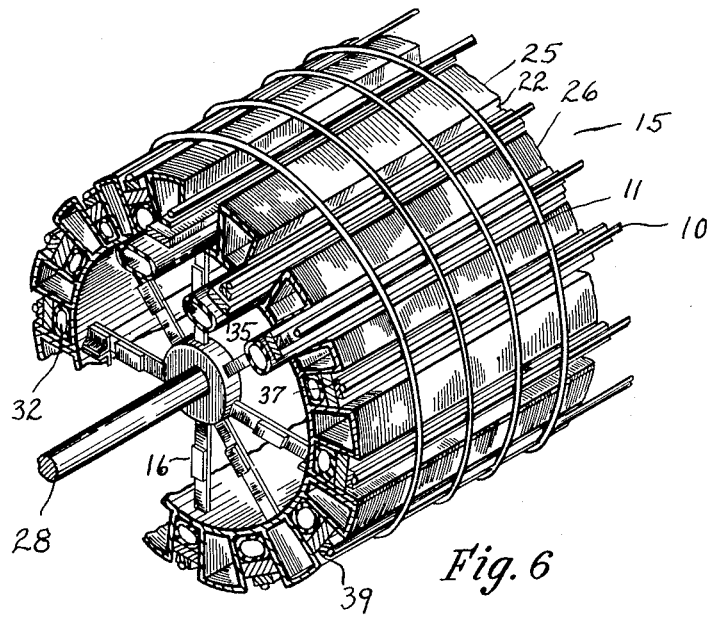
Figure 6 is a perspective detail of the mandrel of Figure 1.
Figure 7:
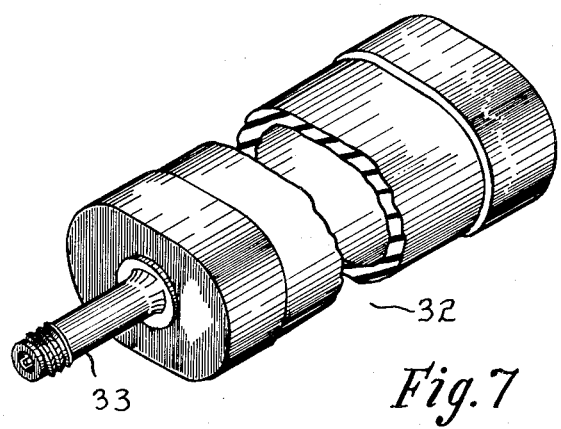
Figure 7 is a perspective view of an inflatable hose used in the mandrel.

Referring first to Figure 5, the cage to be manufactured may consist of a number of longitudinal wires or rods 10 of steel or other suitable metal and rods or wire 11 crossing wires 10 at substantially right angles. Wire 11 may be fabricated in the shape of a helix or may be fabricated in the shape of a number of circular hoops of wire or may even be a number of straight wires curved.

For concrete pipe work, wires 10 and 11 will be of cold drawn steel or hot rolled rod. Wires 10 and 11 may have a diameter of the order of about ⅛ of an inch, although larger or smaller wire may be used as occasion demands. As is well known in concrete pipe work, the degree of reinforcement may be controlled not only by the size wire but also by the spacing.

In order to fabricate the cage as illustrated in Figure 5, for example, a collapsible mandrel generally indicated by 15 may be used. This mandrel has spiders 16 along the length thereof, the mandrel being as long as required to make the necessary width of metal cage. Spiders 16 at the outer ends of their arms carry wire supporting portions 18. The angular extent of wire supporting portions 18 will be governed by the angular separation between the adjacent spokes or legs of the spider. One spider leg may carry or be permanently attached to one wire supporting portion 18 and adjacent spider legs be bolted together as illustrated, for example, in 19.

Each wire supporting portion indicated by 18 consists of inner plate 21 to which is rigidly attached as by welding outwardly extending plates 22 and 23. The free edges of plates 22 and 23 have welded thereto wire supporting plates 25 and 26. These wire supporting plates are generally parallel to inner plate 21. It is understood, of course, that wire support plates 25 and 26, outwardly extending plates 22 and 23, and inner plate 21 are all permanently united together to form a unit which may be bolted or otherwise rigidly positioned adjacent similar units but which may be dismantled when desired. Each wire supporting unit is curved as illustrated, the degree of curvature depending upon the angular extent of each section, as well as the radius of the mandrel.

The entire mandrel is rotatably secured on shaft 28 and may be adjusted to any desired rotary position by any suitable means, such as for example, by pulley 29 and bolt 30.

Assuming that the mandrel is in its assembled form, as illustrated in Figure 1—the mandrel illustrated there being broken but extending completely around for 360°— wire 11 is wound around the mandrel. As has been previously indicated, wire 11 may consist of one wire wound as a helix around the entire mandrel or may consist of a number of separate wires wound to form parallel hoops. In any event, the free ends of wire 11 are bolted down or tied in any suitable manner so that the ends of the wire will be temporarily locked on the mandrel and be prevented from unwinding.

Disposed within the longitudinal channels formed between plates 22 and 23 and bottom or inner plate 21 is rubber or similar flexible hose 32. This hose has one end closed and the other end provided with air valve 33. Air valve 33 may be of the gate valve type such as, for example, as used in water pipe. It is understood, of course, that hose 32 is long enough to extend the entire length of the mandrel. Disposed above hose 32—the orientation illustrated in Figures 2 and 3 is assumed—is slab or strip 35 of some heat insulating material, such as asbestos, for example. Slab or strip 35 is preferably dense so that it can withstand substantial compression. Disposed above insulating strip 35 is metal strip 37 of steel or other similar material. Strips 35 and 37 are wide enough to almost extend the full width of the space between plates 22 and 23. Resting on top of metal strip 37 is relatively narrow bar or rod 39 of copper, brass, aluminum, or other metal having good heat conductivity.

Bar 39 may have the top face thereof slightly indented for accommodating wires 10.

In order to dispose longitudinal wires 10 in position, the various hoses 32 are deflated as indicated in Figure 3 to provide sufficient space between copper bars 39 and wires 11 so that wires 10 may be slid into position. Thereafter hoses 32 may be inflated so that wires 10 are pressed firmly against wires 11 as illustrated in Figure 2.

Welding is accomplished by any suitable welding machine such as, for example, as illustrated in the drawing in Figure 1 and generally indicated by numeral 42. This welder may have massive base 43 provided with flanged rollers 45 operating on rails 46. Rail 47 provides a back stop for the welder, the welder itself having flanged rollers 48 bearing against rail 47. The welder has suitable electrodes 50 and 51 supported by members 53 and 54. Electrodes 50 and 51 are laterally offset from each other to engage spiral wire 11 and longitudinal wire 10 respectively as shown in Figure 4. Air cylinders 55 and 56 are provided, these air cylinders having pistons coupled to the electrode supports for pressing the electrodes against the work. Electrodes 50 and 51 may conveniently be heavy copper rollers connected to a suitable source of current at a low voltage. The vertical spacing and lateral offset between electrodes 50 and 51 cause welding current to pass between wire 11 and wire 10 at a junction. The two wires will be welded together provided they remain pressed tightly against each other.

Starting at one end of the mandrel, the welder may be manipulated to operate on successive joints. The welder goes lengthwise of a mandrel from one joint to another joint. When the welder has moved down the length of the mandrel, the mandrel is turned to present a new longitudinal wire 10 and the various joints to be welded. It is possible for the welder to operate fast and heat the wire to the welding temperature and proceed to the next joint without waiting for the weld to cool. This eliminates the necessity for any member to hold the parts firmly in contact until the weld is cold.

What is claimed is:

1. For use in welding metal mesh, a rotatable mandrel having supporting surfaces lying in a generally cylindrical plane for supporting circularly disposed wires, said circularly disposed wires having the ends locked against unwinding, said mandrel having spaced longitudinal troughs, said troughs extending generally parallel to the axis of the cylindrical supporting plane, said circularly disposed wires extending across the troughs, means including inflatable flexible hose disposed in each trough for providing a resilient support for longitudinal wires lying within said troughs lengthwise thereof, each hose having a generally rigid elongated member extending the full trough length so that each hose can exert force against all circularly disposed wire portions crossing the trough, said inflatable hoses having means for retaining compressed air and being adapted to be deflated to provide clearance space for inserting longitudinal rods below the circularly disposed wires, said hoses being adapted to be inflated after said rods are properly in position whereby said longitudinal rods are pressed outwardly against the circular wires to form a series of tightly pressed parts that may be readily welded.

2. The construction according to claim 1 in combination with welding means.

3. In combination, the construction according to claim 1 and resistance welding means having electrodes for passing a welding current through a pair of tightly pressed parts so that the parts are welded together while being pressed tightly against each other.

4. The mandrel according to claim 1 wherein each longitudinal trough of the mandrel contains heat insulating and metal members between the inflatable hose and the longitudinal rod.

5. The construction according to claim 1 wherein said inflatable hose means includes a heat insulating strip and bar of good heat conducting metal between the inflatable hose and where a longitudinal rod is to be disposed.

References Cited in the file of this patent
UNITED STATES PATENTS

| | | |
|---|---|---|
| 1,640,437 | Chapman | Aug. 30, 1927 |
| 1,783,337 | Little | Dec. 2, 1930 |
| 1,878,760 | Cosgrove et al. | Sept. 20, 1932 |
| 2,040,349 | Wagner | May 12, 1936 |
| 2,369,294 | Harris | Feb. 13, 1945 |
| 2,473,859 | Butler | June 21, 1949 |